United States Patent
Stenfort

(10) Patent No.: US 8,230,159 B2
(45) Date of Patent: Jul. 24, 2012

(54) SYSTEM, METHOD, AND COMPUTER PROGRAM PRODUCT FOR SENDING LOGICAL BLOCK ADDRESS DE-ALLOCATION STATUS INFORMATION

(75) Inventor: Ross John Stenfort, Los Altos, CA (US)

(73) Assignee: LSI Corporation, Milpitas, CA (US)

( * ) Notice: Subject to any disclaimer, the term of this patent is extended or adjusted under 35 U.S.C. 154(b) by 483 days.

(21) Appl. No.: 12/413,312

(22) Filed: Mar. 27, 2009

(65) Prior Publication Data
US 2010/0250829 A1    Sep. 30, 2010

(51) Int. Cl.
*G06F 12/02* (2006.01)

(52) U.S. Cl. ........ 711/103; 711/156; 711/170; 711/202; 711/E12.001; 711/E12.008

(58) Field of Classification Search .................. None
See application file for complete search history.

(56) References Cited

U.S. PATENT DOCUMENTS

| | | | |
|---|---|---|---|
| 5,485,595 A | 1/1996 | Assar et al. | 395/430 |
| 5,544,356 A | 8/1996 | Robinson et al. | 395/600 |
| 5,568,423 A | 10/1996 | Jou et al. | 365/185.33 |
| 5,568,626 A | 10/1996 | Takizawa | 395/430 |
| 5,621,687 A | 4/1997 | Doller | 365/185.29 |
| 5,819,307 A | 10/1998 | Iwamoto et al. | 711/103 |
| 5,835,935 A | 11/1998 | Estakhri et al. | 711/103 |
| 5,881,229 A | 3/1999 | Singh et al. | |
| 5,937,434 A * | 8/1999 | Hasbun et al. | 711/156 |
| 5,956,473 A | 9/1999 | Ma et al. | 395/182.03 |
| 5,963,970 A | 10/1999 | Davis | 711/103 |
| 6,000,006 A | 12/1999 | Bruce et al. | 711/103 |
| 6,154,808 A | 11/2000 | Nagase et al. | 711/103 |
| 6,230,233 B1 | 5/2001 | Lofgren et al. | 711/103 |
| 6,405,295 B1 | 6/2002 | Bando | 711/165 |
| 6,446,183 B1 * | 9/2002 | Challenger et al. | 711/170 |
| 6,539,453 B1 | 3/2003 | Guterman | 711/103 |
| 6,694,402 B1 | 2/2004 | Muller | 711/103 |
| 6,732,221 B2 | 5/2004 | Ban | 711/103 |
| 6,831,865 B2 | 12/2004 | Chang et al. | 365/185.33 |
| 6,914,853 B2 | 7/2005 | Coulson | 365/236 |
| 6,925,523 B2 | 8/2005 | Engel et al. | 711/103 |
| 6,948,026 B2 | 9/2005 | Keays | 711/103 |
| 6,973,531 B1 | 12/2005 | Chang et al. | 711/103 |
| 6,985,992 B1 | 1/2006 | Chang et al. | 711/103 |
| 7,000,063 B2 | 2/2006 | Friedman et al. | 711/103 |
| 7,032,087 B1 | 4/2006 | Chang et al. | 711/156 |
| 7,035,967 B2 | 4/2006 | Chang et al. | 711/103 |
| 7,096,313 B1 | 8/2006 | Chang et al. | 711/103 |
| 7,103,732 B1 | 9/2006 | Chang et al. | 711/156 |
| 7,120,729 B2 | 10/2006 | Gonzalez et al. | 711/103 |
| 7,395,384 B2 * | 7/2008 | Sinclair et al. | 711/156 |
| 7,552,306 B2 * | 6/2009 | Madhavarao et al. | 711/170 |
| 7,681,008 B2 * | 3/2010 | Tomlin et al. | 711/170 |
| 7,689,762 B2 * | 3/2010 | Hobson | 711/103 |
| 7,752,412 B2 * | 7/2010 | Tomlin et al. | 711/170 |
| 2006/0020744 A1 * | 1/2006 | Sinclair et al. | 711/103 |
| 2006/0020745 A1 * | 1/2006 | Conley et al. | 711/103 |
| 2008/0082773 A1 * | 4/2008 | Tomlin et al. | 711/170 |
| 2008/0082774 A1 * | 4/2008 | Tomlin et al. | 711/170 |
| 2008/0276035 A1 * | 11/2008 | Hobson | 711/103 |

* cited by examiner

*Primary Examiner* — Kevin Verbrugge

(74) *Attorney, Agent, or Firm* — PatentVentures; Bennett Smith; Korbin Van Dyke

(57) ABSTRACT

A system, method, and computer program product are provided for sending de-allocation status information. In use, a de-allocation status of at least a portion of memory associated with a logical block address is determined. Additionally, de-allocation status information is generated, based on the determination. Furthermore, the de-allocation status information is sent to a device.

20 Claims, 8 Drawing Sheets

SYSTEM, METHOD, AND COMPUTER PROGRAM PRODUCT FOR SENDING LOGICAL BLOCK ADDRESS DE-ALLOCATION STATUS INFORMATION

FIELD OF THE INVENTION

The present invention relates to memory devices, and more particularly to de-allocating memory in such memory devices.

BACKGROUND

Solid state disks (SSDs) store data differently than hard disk drives (HDDs). An HDD typically allocates a sector of space for every logical block address (LBA). In general, the location of this logical block address does not move.

Solid state disks do not typically pre-allocate space for each logical block address. In addition, solid state disks are operated to periodically move stored data from one location to another to avoid data loss. In some cases, this movement of data may result in a loss of performance and additional wear on a solid state disk.

To avoid this problem it is desirable for an operating system to "free up" logical block addresses on a solid state disk when the data contained in these logical block addresses is no longer valid. To date, techniques for freeing logical block addresses on a solid state disk when the data is no longer valid have been relatively inefficient. There is thus a need for addressing these and/or other issues associated with the prior art.

SUMMARY

A system, method, and computer program product are provided for sending de-allocation status information. In use, a de-allocation status of at least a portion of memory associated with a logical block address is determined. Additionally, de-allocation status information is generated, based on the determination. Furthermore, the de-allocation status information is sent to a device.

DETAILED DESCRIPTION

Figure 1:
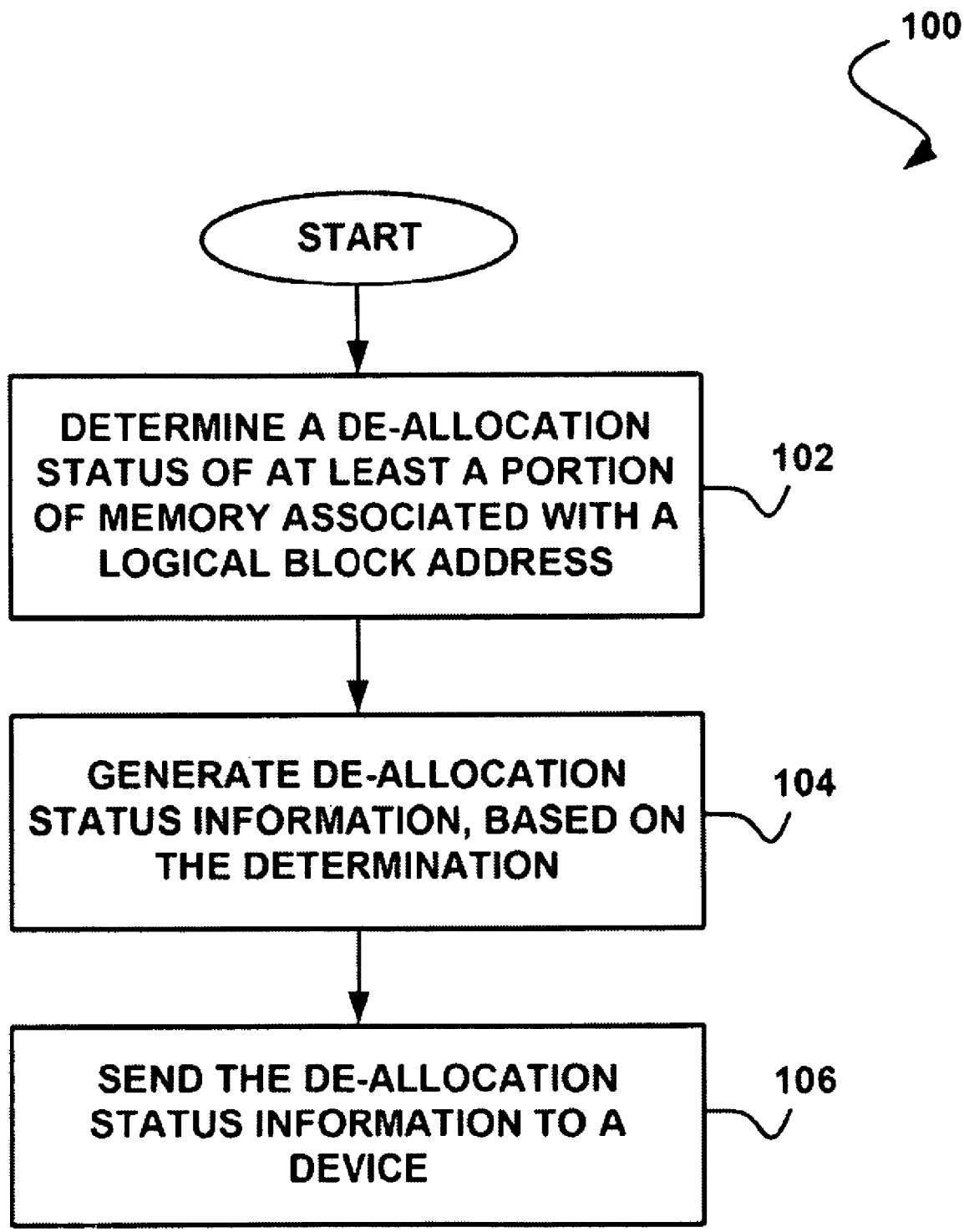
FIG. 1 shows a method for sending logical block address (LBA) de-allocation status information, in accordance with one embodiment

FIG. 1 shows a method 100 for sending logical block address (LBA) de-allocation status information, in accordance with one embodiment. As shown, a de-allocation status of at least a portion of memory associated with a logical block address is determined. See operation 102.

In the context of the present description, a logical block address refers to any item capable of indicating a location of blocks of data stored on a memory device. For example, in one embodiment, the logical block address may include an address of a block of data in memory. In another embodiment, the logical block address may include an address of a portion of memory (e.g. an LBA sector, a portion of an LBA sector, etc.).

The memory may include any type of memory. For example, the memory may include a solid state disk (SSD). In this case, the SSD may include RAM (e.g. SRAM, DRAM, etc.).

In another embodiment, the SSD may include flash memory. In this case, the flash memory may include non-volatile flash memory. In various embodiments, the flash memory may include single-level cell (SLC) flash memory and/or multi-level cell (MLC) flash memory.

Furthermore, in the context of the present description, de-allocation status information refers to any information associated with the de-allocation status of memory. For example, in various embodiments, the de-allocation status information may include an indicator for indicating whether a portion of the memory associated with the logical block address is allocated or de-allocated, an indicator for indicating whether the entire memory associated with the logical block address is allocated or de-allocated, and/or any other information associated with de-allocation status. In this case, de-allocation refers to any technique capable of freeing up logical block addresses, or a portion thereof, in memory.

Once a de-allocation status of at least a portion of memory associated with a logical block address is determined, de-allocation status information is generated based on the determination. See operation 104. Thus, based on the determined status of the memory, the de-allocation status information is generated.

The de-allocation status information is then sent to a device. See operation 106. The device may include any device capable of receiving de-allocation status information. For example, the device may include at least one of a protocol chip, a protocol based buffer, a bridge, a memory controller, and/or any other device capable of receiving de-allocation status information. In one embodiment, the protocol chip and/or the protocol based buffer may be associated with one of a Small Computer System Interface (SCSI) protocol and an AT Attachment (ATA) protocol.

Similarly, the de-allocation status may be determined and the de-allocation status may be generated using a variety of devices. For example, in one embodiment, the de-allocation status information may be generated and/or sent by a memory controller (e.g. a flash controller, etc.). In another embodiment, a bridge may generate and send the de-allocation status information to the device. In yet another embodiment, a protocol chip may generate and send the de-allocation status information to the device.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
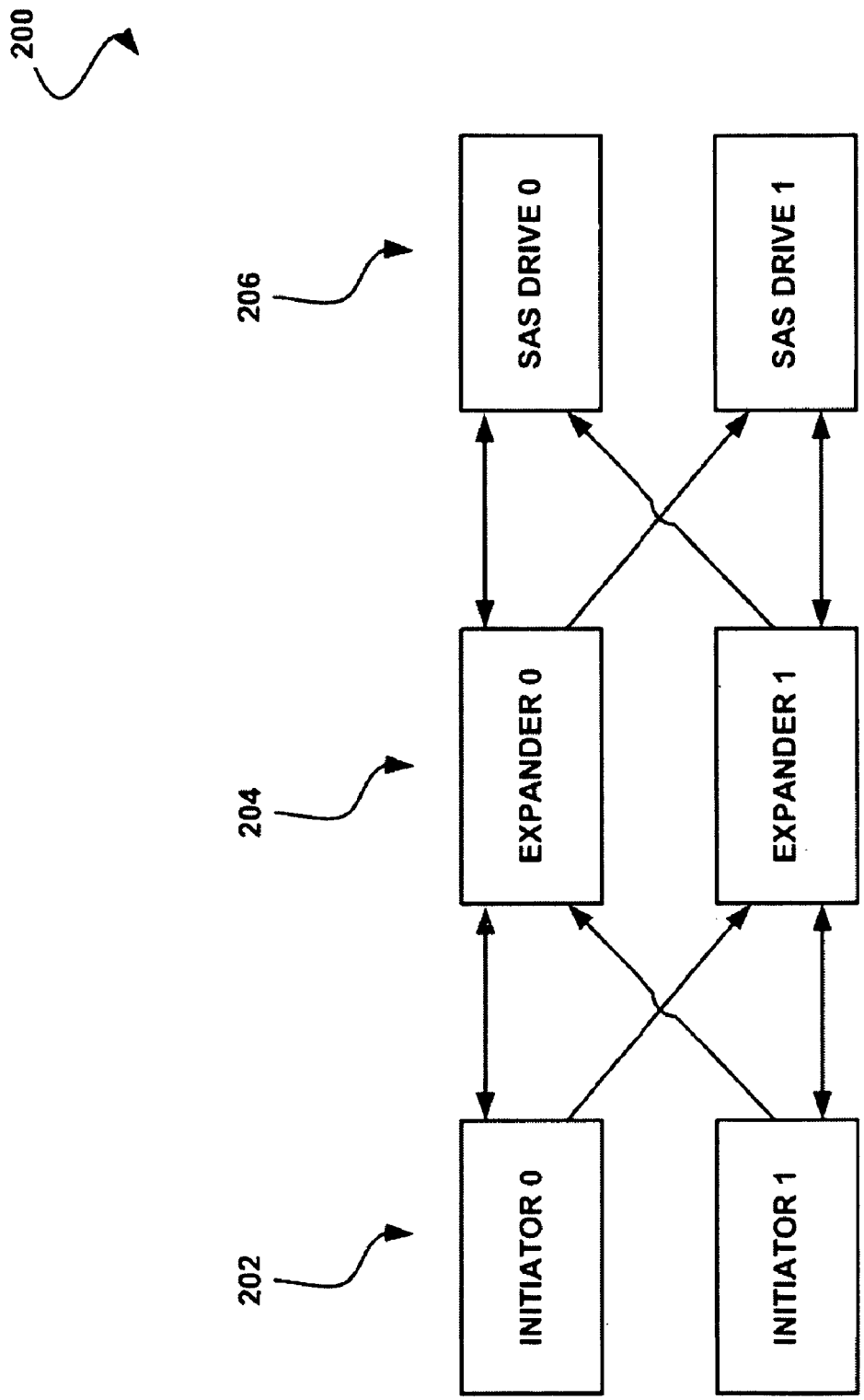
FIG. 2 shows a system for sending logical block address de-allocation status information, in accordance with one embodiment.

FIG. 2 shows a system 200 for sending logical block address de-allocation status information, in accordance with one embodiment. As an option, the present system 200 may be implemented to carry out the method 100 of FIG. 1. Of course, however, the system 200 may be implemented in any desired environment. It should also be noted that the aforementioned definitions may apply during the present description.

As shown, the system 200 may include one or more initiators 202. The initiators 202 may be coupled to and in communication with one or more expanders 204. Additionally, the initiators 202 and the expanders 204 may be coupled to and in communication with one or more memory devices 206. In one embodiment, the one or more memory devices 206 may include one or more Serial Attached SCSI (SAS) drives. In this case, the system 200 may operate as Serial Attached SCSI (SAS) system with SAS drives.

In operation, a de-allocation status of at least a portion of the memory devices 206 associated with a logical block address may be determined. In one embodiment, the de-allocation status may be determined by one or more components of one or more of the memory devices 206. For example, the de-allocation status may be determined by a controller of the memory devices 206. In another embodiment, the de-allocation status may be determined by a chip and/or logic associated with the memory devices 206.

Once the de-allocation status is determined, de-allocation status information may be generated. In this case, the de-allocation status information may be generated by any component or logic associated with the memory devices 206. In one embodiment, these components may also send de-allocation status information to one or more devices.

In this case, the device may include a device that queried for the de-allocation status information (e.g. a memory controller, etc.). In one embodiment, the de-allocation status information may include an indicator for indicating whether at least a portion of the memory associated with the logical block address is de-allocated. As an option, the indicator may indicate a mapped status when at least a portion of the memory associated with the logical block address is allocated.

As another option, the indicator may indicate an unmapped status when at least a portion of the memory associated with the logical block address is de-allocated. In another embodiment, sending the de-allocation status information to the device may include sending a bad status if an unmapped memory block is read. For example, if memory or a portion of memory that is de-allocated is attempted to be read, a bad status indication may be utilized to indicate a de-allocation status of that memory portion.

The de-allocation status determination may be initiated in a variety of ways. For example, in one embodiment, there may be a query for the de-allocation status. In this case, the de-allocation status may be initiated by the querying. The query may be in a variety of forms. For example, the query may include sending a de-allocation status query command and/or a de-allocation command.

Once data is de-allocated from at least a portion of memory devices 206, the data that has been de-allocated may be specified utilizing a command, a mode page, or any other technique for logging or specifying the data that has been de-allocated.

Additionally, a command or a mode page may be utilized to specify a format of data to be returned for de-allocated data. In this case, the format may include data, flags or a combination of data and flags.

It should be noted that the data that is de-allocated may include user data, protection data, or both user data and protection data. Additionally, the portion of memory associated with the logical block address that is de-allocated or for which de-allocation status information is provided may include one of multiple logical block address sectors, one logical block address sector, or a portion of a logical block address sector.

In one embodiment, memory or a portion of memory may be de-allocated based on a pattern of data. For example, if stored data (e.g. user data, protection data, or both user and protection data, etc.) exhibits a pattern, at least repetitive portions of the data may be de-allocated. As an option, this data that is to be de-allocated may be specified by a command, mode page, or other technique.

In one embodiment, a command to write a pattern of data may be detected. For example, the command to write a pattern of data may include one of a WRITE SAME command, a FORMAT command, or any other command capable of causing a pattern to be written. In this case, at least one of user data or protection data may be de-allocated based on the command to write a pattern of data. It should be noted that the user data may be stored separate from protection data in the memory.

Figure 3:
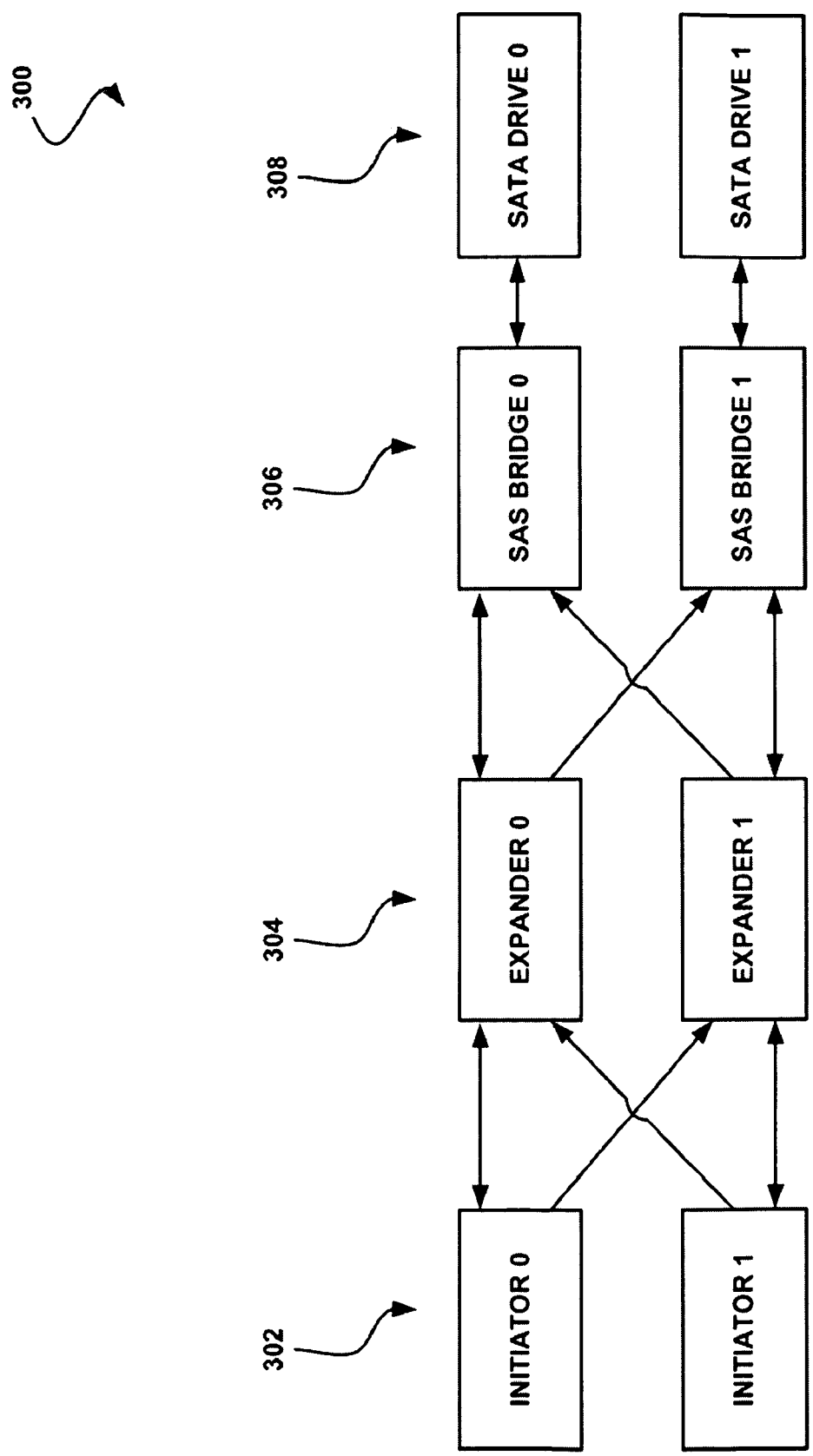
FIG. 3 shows a system for sending logical block address de-allocation status information, in accordance with another embodiment.

FIG. 3 shows a system 300 for sending logical block address de-allocation status information, in accordance with another embodiment. As an option, the present system 300 may be implemented in the context of the details of FIGS. 1-2. Of course, however, the system 300 may be implemented in any desired environment. Again, the aforementioned definitions may apply during the present description.

As shown, the system 300 may include one or more initiators 302. The initiators 302 may be coupled to and in communication with one or more expanders 304. Additionally, one or more bridges 306 may be positioned such that information transmitted from the initiators 302 and/or the expanders 304 is received by the one or more bridges 306 before being communicated to one or more memory devices 308.

In one embodiment, the one or more bridges 306 may include one or more Serial Attached SCSI (SAS) bridges. Additionally, in one embodiment, the one or more memory devices 308 may include one or more Serial ATA (SATA) drives. In this case, the system 300 may operate as SAS system with SAS bridges for converting Serial SCSI Protocol (SSP) information or Serial Management Protocol (SMP) information to SATA information.

In one embodiment, one or more of the bridges 306 may receive logical block address de-allocation information, such as a command to de-allocate at least a portion of the one or more memory devices 308. In the context of the present description, de-allocation information refers to any information associated with the de-allocation of memory. For example, in various embodiments, the de-allocation information may include de-allocation commands (i.e. commands to de-allocate one or more portions of memory, etc.), allocation or de-allocation status, and/or any other information associated with de-allocation.

In some cases, the de-allocation command may be a first format associated with a first protocol, such as an SSP or SMP format. One or more of the bridges 306 may then convert the de-allocation command in the SSP or SMP format to a second format associated with a second protocol, such as a SATA format associated with the one or More SATA drives 308.

The drives 308 may then de-allocate data in response to the converted de-allocation command. It should be noted that the de-allocation command may include a command to de-allocate user data, protection information, and both user and protection data stored in the memory 308. Furthermore, the de-allocation command may include a command to de-allocate an LBA sector, multiple LBA sectors, and/or a portion of an LBA sector.

In one embodiment, converting the logical block address de-allocation information in the first format to the second format may include converting an SCSI UNMAP command to an ATA data set management command (e.g. using a TRIM command, etc.). It should be noted that the de-allocation information conversion is not limited to de-allocation commands. For example, in on embodiment, the bridges 306 may convert any SCSI command to an ATA command. These commands may include data queries, power notifications (e.g. power loss primitives such as a NOTIFY primitive, etc.), and various other information.

Additionally, the bridges 306 are not necessarily limited to converting information in one direction. The bridges 306 may also convert information being communicated from the memory devices 308. For example, in one embodiment, a de-allocation status may be sent from the memory devices 308. In this case, the logical block address de-allocation information may include the de-allocation status information. In various embodiments, this status may be in response to a query or another command sent to the memory devices 308.

More information regarding converting the logical block address de-allocation information in the first format to the second format may be found in U.S. patent application Ser. No. 12/413,307, titled "SYSTEM, METHOD, AND COMPUTER PROGRAM PRODUCT FOR CONVERTING LOGICAL BLOCK ADDRESS DE-ALLOCATION INFORMATION IN A FIRST FORMAT TO A SECOND FORMAT," filed on Mar. 27, 2009, which is incorporated by reference in its entirety.

In some cases, user data and protection data stored in the memory devices 308 may be de-allocated independently. In one embodiment, it may be determined whether one of user data or protection data associated with the logical block address de-allocation information can be de-allocated independently. As an option, one or more of the bridges 306 may make this determination.

If it is determined that one of the user data or the protection data associated with the logical block address de-allocation information can be de-allocated independently, one of the user data or the protection data may be de-allocated independently. In one embodiment, this determination may be made based on a pattern of the user data or the protection data.

For example, the user data and/or the protection data may illustrate a pattern such that any data other than one full occurrence of the pattern in memory may be de-allocated. In this case, the de-allocating may occur in an LBA sector, multiple LBA sectors, and/or a portion of an LBA sector.

In still another embodiment, power loss information may be received (e.g. by the bridge 306, a controller of the memory device, etc.) in the first format associated with the first protocol. In this case, the power loss information in the first format may be converted to the second format associated with the second protocol. For example, the power loss information may include an SCSI power loss primitive (e.g. a NOTIFY primitive, etc.). Thus, converting the power loss information in the first format to the second format may include converting the SCSI power loss primitive into an ATA flush cache command.

Additionally, converting the power loss information in the first format to the second format may include converting a power loss primitive or a power loss command to a primitive or command for hardening data. In the context of the present description, hardening data refers to any technique of writing data in cache to memory such as flash memory. Accordingly, a power loss primitive or command may be received by the bridges 306 and may be converted to any command or primitive for hardening the stored data.

More information regarding hardening data may be found in U.S. patent application Ser. No. 12/413,329, titled "SYSTEM, METHOD, AND COMPUTER PROGRAM PRODUCT FOR HARDENING DATA STORED ON A SOLID STATE DISK," filed on Mar. 27, 2009, which is incorporated by reference in its entirety.

Figure 4:
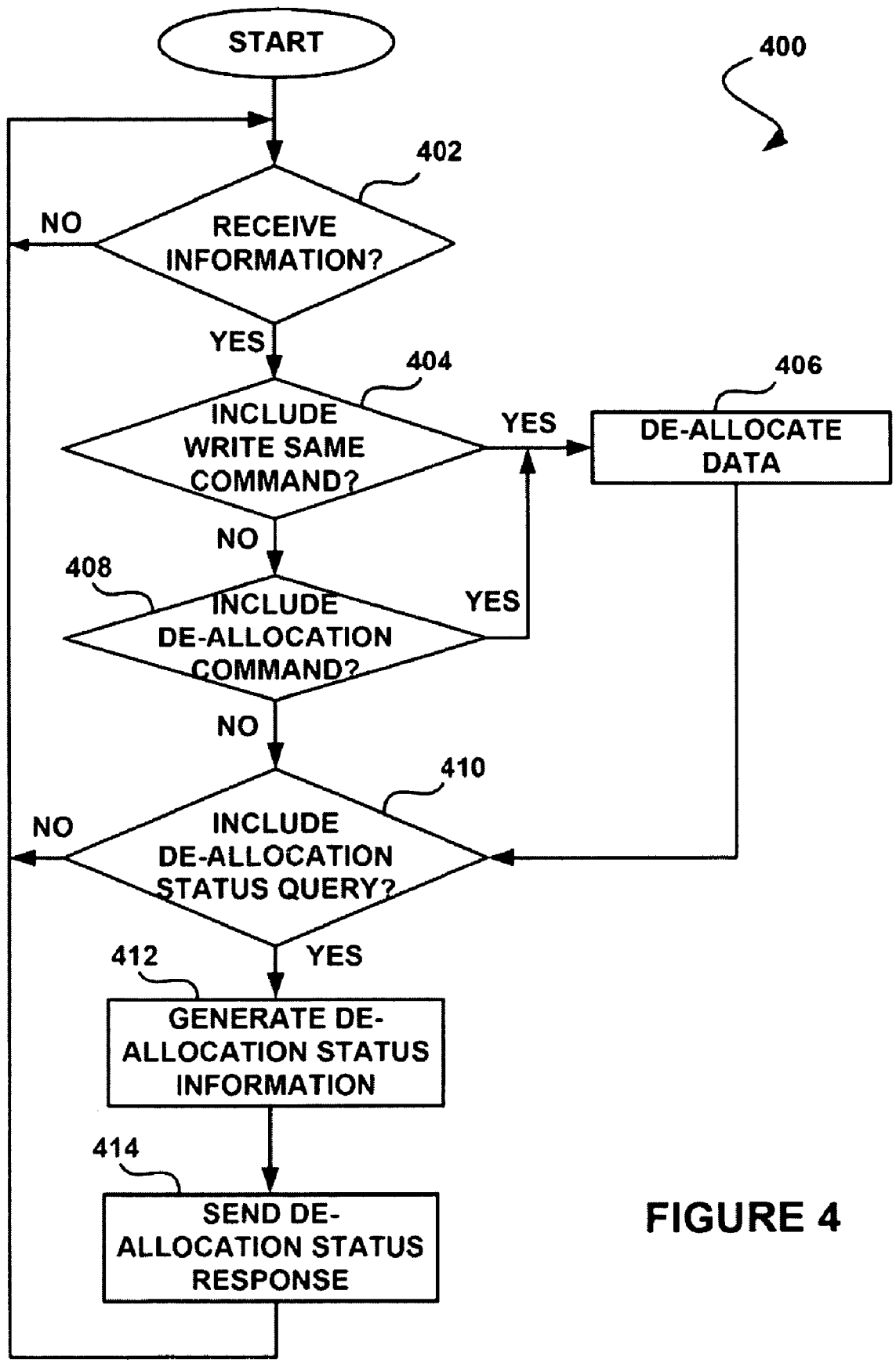
FIG. 4 shows a method for sending logical block address de-allocation status information, in accordance with another embodiment.

FIG. 4 shows a method 400 for sending logical block address de-allocation status information, in accordance with another embodiment. As an option, the present method 400 may be implemented in the context of the functionality and architecture of FIGS. 1-3. Of course, however, the method 400 may be carried out in any desired environment. Further, the aforementioned definitions may apply during the present description.

As shown, it is determined if information is received. See option 402. In one embodiment, this determination may be made at one or more flash controllers, or other controller of a memory device. In this case, the flash controllers may include logic and/or hardware for making such determination, as well as for making any other decisions and/or performing additional functions.

If information is received, it is determined whether the received information includes a WRITE SAME command, or other pattern initiating command (e.g. a FORMAT command, etc.). See operation 404. If the received information includes a WRITE SAME command, or other pattern initiating command, data stored in the memory device may be de-allocated based on that command. See operation 406.

In this case, a WRITE SAME command, a FORMAT command, and other commands that include writing patterns may be used to determine that the memory location storing or directed to store duplicate data (e.g. any pattern of data following the initial data, etc.) may be de-allocated. This data may include user data and/or protection data. Furthermore, it should be noted that, while in one embodiment a flash controller may be utilized to make this detection, in other embodiments, different devices may be utilized to make this detection (e.g. a bridge, a protocol chip, etc.). Thus, such technique may be implemented in systems implementing bridges.

More information regarding de-allocating memory in memory systems with bridges may be found in U.S. patent application Ser. No. 12/413,307 titled "SYSTEM, METHOD, AND COMPUTER PROGRAM PRODUCT FOR CONVERTING LOGICAL BLOCK ADDRESS DE-ALLOCATION INFORMATION IN A FIRST FORMAT TO A SECOND FORMAT," filed on Mar. 27, 2009, which has been incorporated by reference in its entirety.

In addition to determining whether the received information includes a WRITE SAME command, or other pattern initiating command, it is determined whether the information includes a de-allocation command. See operation 408. If the information includes a de-allocation command (e.g. an SCSI de-allocation command, an ATA de-allocation command, etc.), data stored in the memory device may be de-allocated based on that command. In one embodiment, this may include converting an SCSI UNMAP command to an ATA DATA SET MANAGEMENT command. The de-allocation may include de-allocating user data, protection data, or both.

As shown further in FIG. 4, it is determined whether the received information includes a de-allocation status query.

See operation 410. It should be noted that, in one embodiment, a de-allocation query need not be sent to receive de-allocation status information. For example, a memory device may automatically send de-allocation status information (e.g. upon de-allocation, at a timed interval, etc.).

If the information includes a de-allocation status query, de-allocation status information is generated. See operation 412. The de-allocation status information may then be sent to a device capable of receiving the de-allocation status information. See operation 414.

Figure 5:
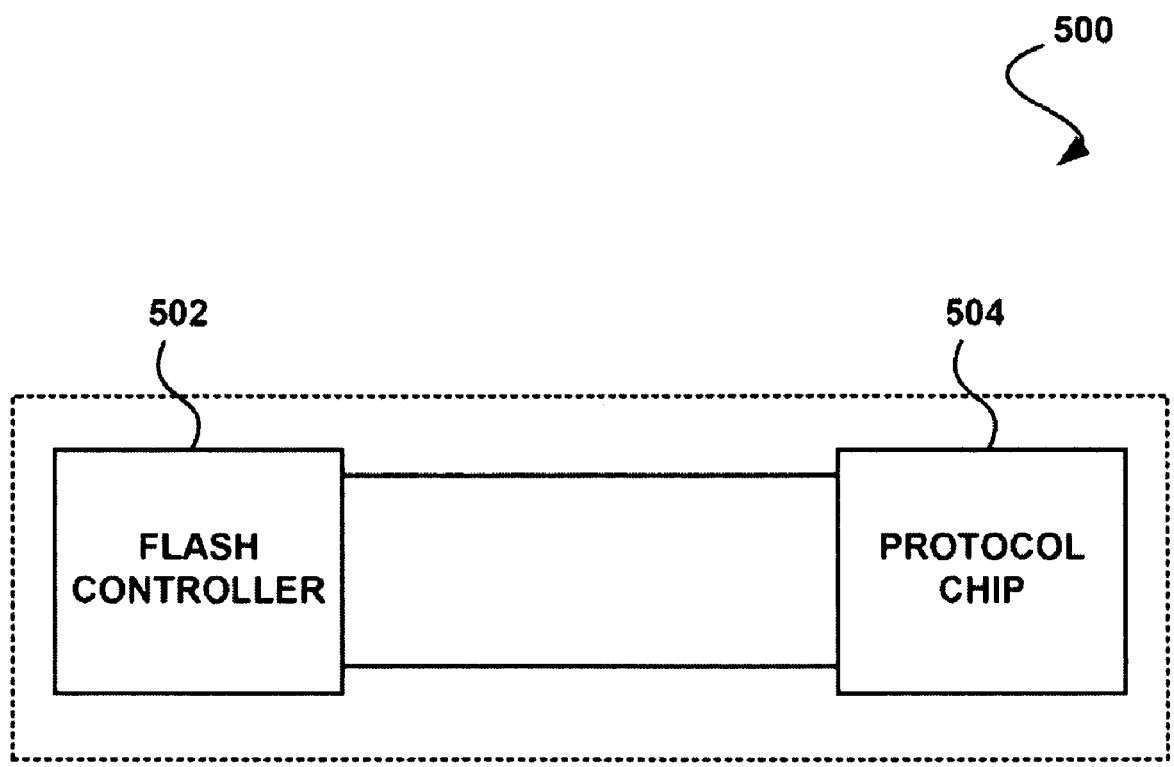
FIG. 5 shows a system for sending logical block address de-allocation status information, in accordance with another embodiment.

FIG. 5 shows a system 500 for sending logical block address de-allocation status information, in accordance with another embodiment. As an option, the present system 500 may be implemented in the context of the details of FIGS. 1-4. Of course, however, the system 500 may be implemented in any desired environment. Again, the aforementioned definitions may apply during the present description.

As shown, the system 500 includes one or more blocks or chips 502-504. In a configuration where there are two blocks or two chips, where one of these is a protocol engine/buffer on a chip and the other is a flash controller, the de-allocation process and read data may be implemented in a controlled fashion. This may be accomplished in a variety of ways.

For example, in one embodiment, the flash controller 502 may send data for UNMAPPED LBAs to a protocol buffer associated with the protocol chip 504. In this case, however, the protocol buffer may need to simulate certain characteristics because the buffer may not have any knowledge that the LBA is trimmed. Additionally, in this case, a VERIFY command with a BYTE CHK=1 may not be implemented properly. As an option, a constant field in the flash controller 502 may be utilized.

In another embodiment, the flash controller 502 may report to the protocol chip 504 or protocol buffer that the LBA is de-allocated. On reads, the protocol buffer may then need to generate the data. This may allow more flexibility for the protection field as the protocol buffer may have more hooks to generate this information. This also may offer more flexibility for protection techniques, other than data integrity field (DIF) protection. When random data is in the protection fields, other techniques may be implemented as this may allow for the VERIFY command with BYTE CHK=1 to generate a CHECK condition.

In yet another embodiment, the flash controller 502 may have two independent pieces of data in a block. For example, it may have user data and protection data. If the user data and protection data are read, written, and/or de-allocated independently, then any protection scheme may be supported. Additionally, most techniques of FORMAT and WRITE SAME commands may be supported. Table 1 shows options that may be supported, in accordance with one embodiment.

TABLE 1

| Function | User Data | Protection Data |
| --- | --- | --- |
| De-Allocate | X | |
| De-Allocate | X | X |
| De-Allocate | | X |
| Information Read | X | X |
| Information Read | Reported as De-allocated | X |
| Information Read | Reported as De-allocated | Reported as De-allocated |
| Information Read | X | Protection not supported |
| Information Written | X | X |
| Information Written | X | Protection not supported |
| Information Written | De-allocated | X |
| Status of de-allocation | X | X |

Thus, using the system 500, the flash controller 502 may return information to the protocol chip 504, a block, or a protocol based buffer that a block or pieces of a block is unmapped. Additionally, the flash controller 502 may return information to the protocol chip 504, block, or a protocol based buffer that a block or pieces of a block is unmapped, instead of data. Still yet, the flash controller 502 may return part of a block to the protocol chip 504, block, or a protocol based buffer that part of the data in a block is unmapped and return data for the part of the data that is mapped.

As noted above, in one embodiment, the flash controller may receive a command or other data that queries the status of a block to determine if it is mapped. This command or other query may optionally include parameters and may not require the data in the block to be provided to the querying device. This is different than a read verify with a byte check equal to 1 as this may require the initiator to provide the data for the block. Furthermore, storing the user data and protection data separately may allow for read commands that do not use protection to operate without disturbing the protection data.

Figure 6:
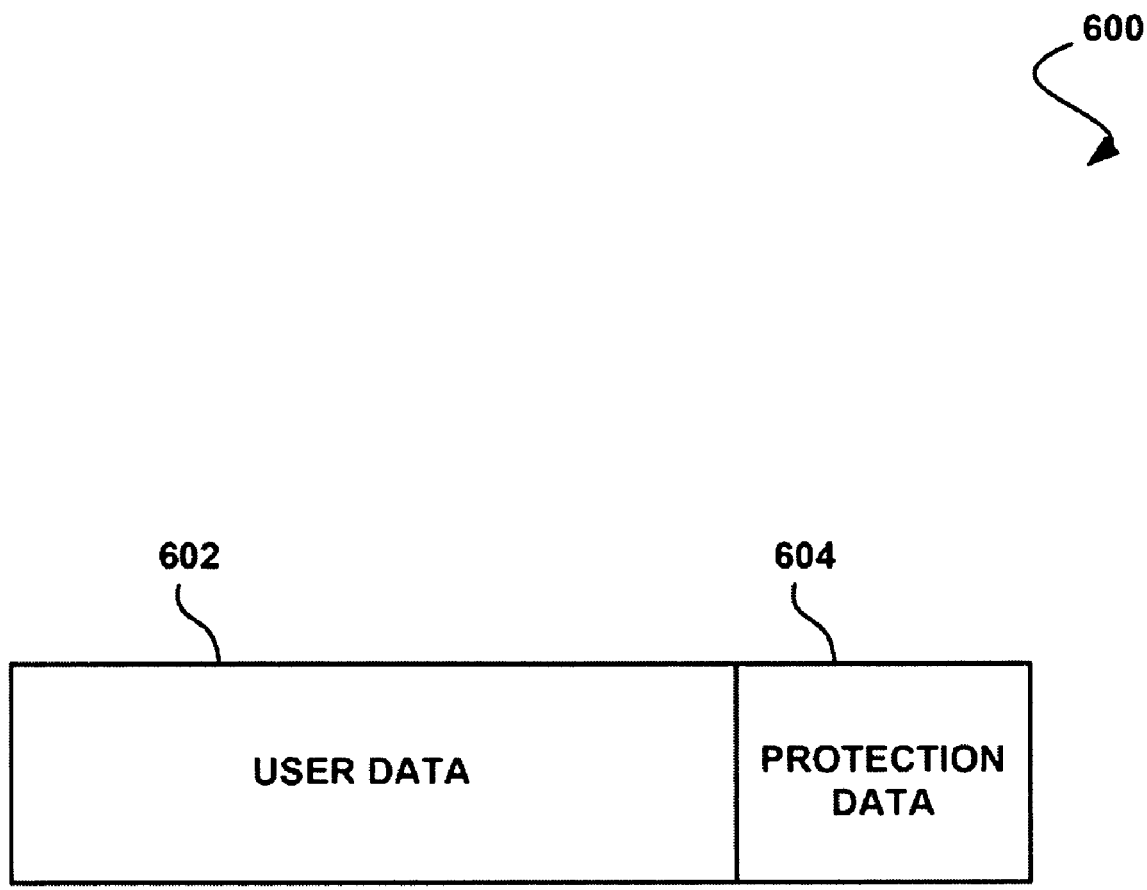
FIG. 6 shows a system including a logical block address sector for separately storing user data and protection data, in accordance with one embodiment.

FIG. 6 shows a system 600 including an LBA sector for separately storing user data and protection data, in accordance with one embodiment. As an option, the present system 600 may be implemented in the context of the details of FIGS. 1-5. Of course, however, the system 600 may be implemented in any desired environment. Further, the aforementioned definitions may apply during the present description.

As shown, the LBA sector may store user data 602 and protection data 604 separately. This may be implemented such that the user data 602 or the protection data 604 may be operated on separately, without disturbing the data that is not included in the operation. In one embodiment, the LBA sector may include multiple user data and/or protection fields.

Figure 7:
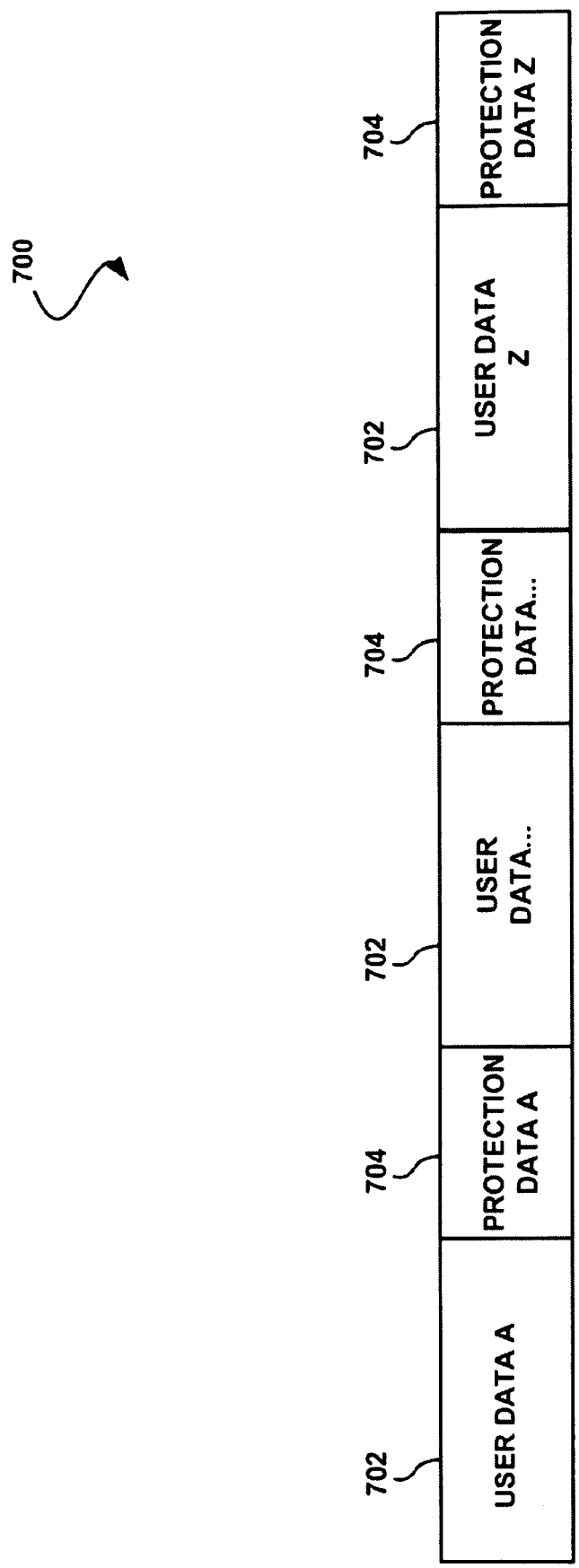
FIG. 7 shows a system including a logical block address sector for separately storing user data and protection data, in accordance with another embodiment.

FIG. 7 shows a system 700 including an LBA sector for separately storing user data and protection data, in accordance with another embodiment. As an option, the present system 700 may be implemented in the context of the details of FIGS. 1-6. Of course, however, the system 700 may be implemented in any desired environment. Again, the aforementioned definitions may apply during the present description.

As shown, the LBA sector may store multiple sections of user data 702 and protection data 704 separately. This may be implemented such that any of the sections of the user data 702 and/or any of the sections of the protection data 704 may be operated on separately, without disturbing the data that is not included in the operation.

Figure 8:
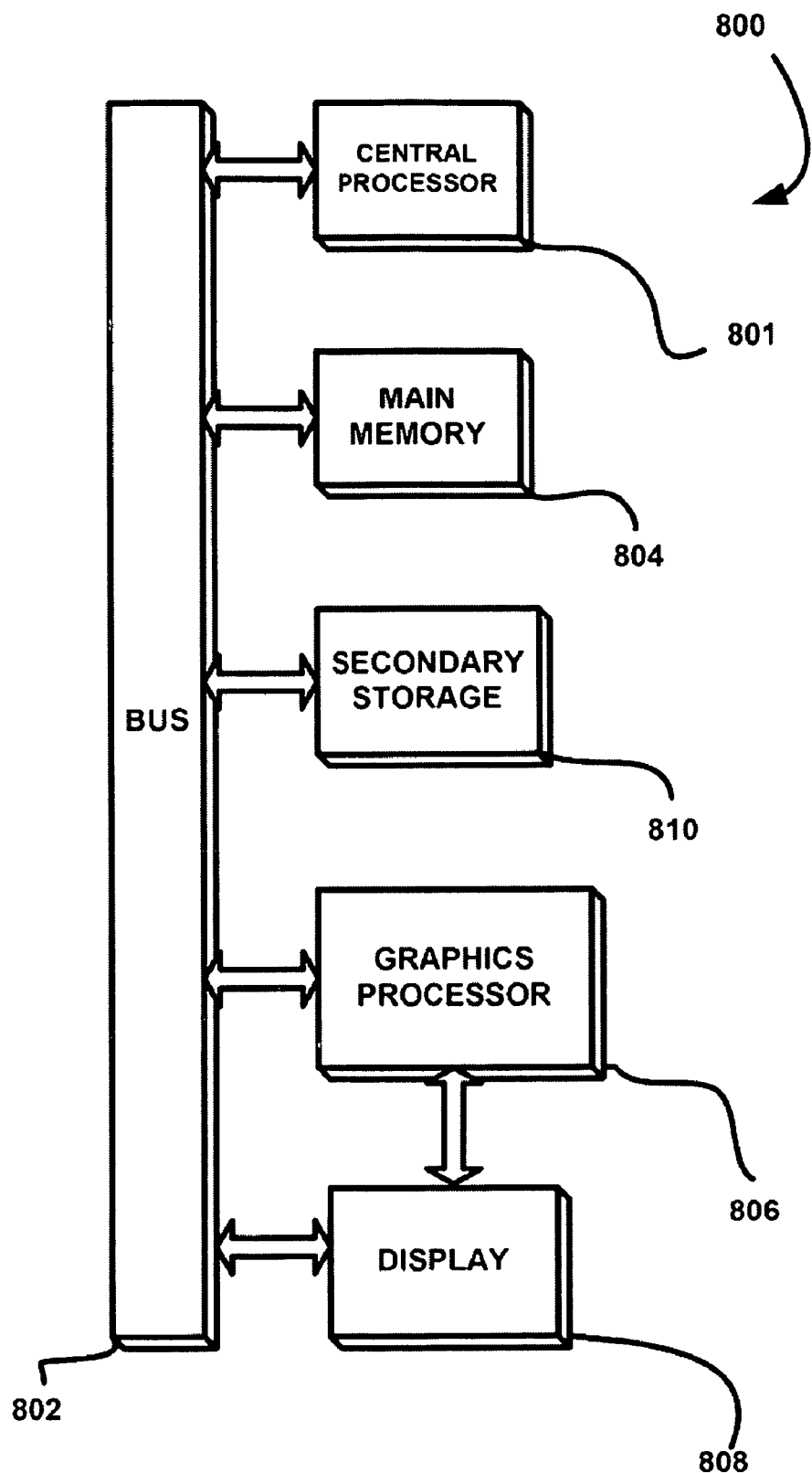
FIG. 8 illustrates an exemplary system in which the various architecture and/or functionality of the various previous embodiments may be implemented.

FIG. 8 illustrates an exemplary system 800 in which the various architecture and/or functionality of the various previous embodiments may be implemented. As shown, a system 800 is provided including at least one host processor 801 which is connected to a communication bus 802. The system 800 also includes a main memory 804. Control logic (software) and data are stored in the main memory 804 which may take the form of random access memory (RAM).

The system 800 also includes a graphics processor 806 and a display 808, i.e. a computer monitor. In one embodiment, the graphics processor 806 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 800 may also include a secondary storage 810. The secondary storage 810 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 804 and/or the secondary storage 810. Such computer programs, when executed, enable the system 800 to perform various functions. Memory 804, storage 810 and/or any other storage are possible examples of computer-readable media.

In one embodiment, the architecture and/or functionality of the various previous figures may be implemented in the context of the host processor 801, graphics processor 806, an integrated circuit (not shown) that is capable of at least a portion of the capabilities of both the host processor 801 and the graphics processor 806, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 800 may take the form of a desktop computer, lap-top computer, and/or any other type of logic. Still yet, the system 800 may take the form of various other devices including, but not limited to, a personal digital assistant (PDA) device, a mobile phone device, a television, etc.

Further, while not shown, the system 800 may be coupled to a network [e.g. a telecommunications network, local area network (LAN), wireless network, wide area network (WAN) such as the Internet, peer-to-peer network, cable network, etc.] for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   receiving a de-allocation command from a requestor;
   selectively de-allocating user data, protection data, or both user data and protection data from at least a portion of memory associated with a logical block address, in response to the de-allocation command;
   determining a de-allocation status of the at least a portion of memory associated with the logical block address, in response to a query from the requestor;
   generating de-allocation status information, based on the determination; and
   sending the de-allocation status information to the requestor.

2. The method of claim 1, wherein the de-allocation status information includes an indicator for indicating whether the at least a portion of the memory associated with the logical block address is de-allocated.

3. The method of claim 2, wherein the indicator indicates a mapped status when the at least a portion of the memory associated with the logical block address is allocated.

4. The method of claim 2, wherein the indicator indicates an unmapped status when the at least a portion of the memory associated with the logical block address is de-allocated.

5. The method of claim 1, further comprising automatically sending additional de-allocation status information.

6. The method of claim 5, wherein the automatically sending of the additional de-allocation status information is at a timed interval.

7. The method of claim 5, wherein the automatically sending of the additional de-allocation status information is upon de-allocation.

8. The method of claim 1, further comprising specifying data that is de-allocated from the at least a portion of memory associated with the logical block address.

9. The method of claim 8, wherein one of a command or a mode page is utilized to specify one of the data that is de-allocated or a format of data to be returned for de-allocated data.

10. The method of claim 8, wherein the data that is de-allocated includes at least a portion of at least one of the user data or the protection data.

11. The method of claim 1, wherein the at least a portion of memory associated with the logical block address includes one of multiple logical block address sectors, one logical block address sector, or a portion of a logical block address sector.

12. The method of claim 1, wherein the sending of the de-allocation status information to the device includes sending a bad status if an unmapped memory block is read.

13. The method of claim 1, further comprising detecting a command to write a pattern of data.

14. The method of claim 13, wherein the command to write a pattern of data includes one of a WRITE SAME command or a FORMAT command.

15. The method of claim 13, wherein at least one of the user data or the protection data is de-allocated based on the command to write a pattern of data.

16. The method of claim 1, further comprising storing the user data separate from the protection data in the at least a portion of memory associated with the logical block address.

17. The method of claim 1, wherein the requester is enabled to convert logical block address de-allocation information in a first format associated with a first protocol to logical block address de-allocation information in a second format associated with a second protocol, and the de-allocation command comprises the logical block address de-allocation information in the second format.

18. The method of claim 1, wherein the requestor includes at least one of a protocol chip or protocol based buffer.

19. A computer program product embodied on a computer readable medium, comprising:
   computer code for receiving a de-allocation command from a requestor;
   computer code for selectively de-allocating user data, protection data, or both user data and protection data from at least a portion of memory associated with a logical block address, in response to the de-allocation command;
   computer code for determining a de-allocation status of the at least a portion of memory associated with the logical block address, in response to a query from the requestor; and
   computer code for generating de-allocation status information, based on the determination; and computer code for sending the de-allocation status information to the requestor.

20. An apparatus, comprising:

a memory controller for receiving a de-allocation command from a requestor, for selectively de-allocating user data, protection data, or both user data and protection data from at least a portion of memory associated with a logical block address, in response to the de-allocation command, for determining a de-allocation status of the at least a portion of memory associated with the logical block address, in response to a query from the requestor, for generating de-allocation status information based on the determination, and for sending the de-allocation status information to the requestor.

* * * * *